United States Patent Office 2,860,171
Patented Nov. 11, 1958

2,860,171

PRODUCTION OF 1,1 DIALKOXYALKANES FROM ALCOHOLS

Arthur C. Whitaker, Pittsburgh, Pa., assignor to Gulf Research & Development Company, Pittsburgh, Pa., a corporation of Delaware No Drawing. Application August 15, 1955
Serial No. 528,560

9 Claims. (Cl. 260—615)

This invention relates to the conversion of alcohols to valuable organic compounds and more particularly to a process for converting selected alcohols to a product comprising a dialkoxyalkane.

Briefly, the present process comprises heating a primary aliphatic, or a mixture of primary aliphatic and secondary alcohols, in the presence of a strong dehydrogenation catalyst under conditions and for a time sufficient to obtain a product containing a substantial amount of dialkoxyalkanes.

To obtain a product comprising dialkoxyalkanes in accordance with the present invention any aliphatic primary monofunctional alcohol, or mixtures of such alcohols and secondary alcohols, can be employed. Best results are obtained with alcohols having above two carbon atoms, although alcohols having from about 6 to about 18 carbon atoms are preferred. Examples of alcohols which can be used are isooctyl alcohol, isodecyl alcohol, isotridecyl alcohol, n-heptyl alcohol, n-amyl alcohol, isoamyl alcohol, etc.

Generally the present reaction can be carried out effectively at the reflux temperature of the alcohol being treated. While a temperature as low as about 120° C. can be used and satisfactory results will be obtained, it is preferred to employ temperatures in excess thereof. Thus, a temperature of about 285° C. or higher can be used if desired. In general, however, a temperature of about 150° to about 225° C. is considered most satisfactory.

Generally the present process can be carried out effectively at atmospheric pressure. However, in the event the boiling point of the alcohol being treated is below the temperature of the reaction, the reaction can be carried out in a confined system, in which case a pressure as high as about 250 pounds per square inch, preferably no higher than about 100 pounds per square inch, can be used. In the event, however, the reaction is carried out at elevated pressures and in a confined system, care should be exercised to remove from the reaction area substantially all of the hydrogen and water which may be produced during the course of the reaction, for water and hydrogen inhibit the desired reactions and substantially no yield of the conversion product comprising dialkoxyalkanes is obtained.

The time required for the reaction is not critical and can be varied as desired, although it should be sufficiently long to insure obtaining an appreciable conversion of the alcohol to the desired product. In general a reflux time of about 3 to about 26 hours is adequate, although best results are obtained with a period of about 5 to about 12 hours.

Any strong dehydrogenation catalyst is considered satisfactory for the present reaction. Good results are generally obtained with a nickel, cobalt or iron dehydrogenation catalyst, preferably in a reduced state. Best results are obtained with a nickel dehydrogenation catalyst. While reduced nickel, cobalt and iron dehydrogenation catalysts are preferred, it is within the scope of the present invention to employ compounds of such metals, preferably salts, organic as well as inorganic, which during the course of the reaction will be substantially converted to the elemental metal. Examples of suitable dehydrogenation catalysts which can be used in the present process are nickel acetate tetrahydrate, nickel octanoate, nickel naphthenate, cobalt acetate tetrahydrate, cobalt octanoate, cobalt naphthenate, iron acetate tetrahydrate, iron octanoate, iron naphthenate, etc. The amount of catalyst needed for satisfactory operation of the present process is not critical although it should be present in an amount sufficient to catalyze the reaction. In general from 1 to about 10 percent, preferably about 3 to about 7 percent by weight of catalyst, based on the alcohol treated is adequate.

While I do not intend to be limited by theory, it is believed the alcohol is initially dehydrogenated to the corresponding aldehyde. The aldehyde in turn reacts with a remaining molecule of alcohol to form a hemiacetal. The hemiacetal can then do one of two things. If the hemiacetal has a structure such that the carbon adjacent the hydroxy-containing carbon has one or two hydrogen atoms, then dehydration can occur to give an unsaturated ether. In any event some of the hemiacetal will react with a remaining molecule of alcohol to form an acetal with the elimination of one molecule of water. Accordingly, the product formed herein by the conversion of the alcohol comprises acetals in any event and can include unsaturated ethers on certain occasions. The separation of ethers from a mixture containing them and acetals can be effected by simple distillation means.

The acetals and the unsaturated ethers produced herein can be hydrogenated to yield alcohols and ethers and the corresponding saturated ethers, respectively. Thus, the unsaturated ethers can easily be hydrogenated to the corresponding saturated ethers by heating the unsaturated ethers at about 150° C. for about 3 hours under an atmosphere of hydrogen at 1000 pounds per square inch.

The acetals produced herein can be used as lubricants. Thus, a typical acetal has a pour point below $-75°$ F. and a viscosity at 210° F. of 2.22 centistokes. The ethers can be employed as high molecular weight solvents and plasticizers.

The process of this invention can further be illustrated by the following examples.

*Example I*

300 grams of isooctyl alcohol were mixed with 10.9 grams of nickel acetate tetrahydrate and 12.5 grams of isooctanoic acid. Isooctanoic acid was used to react with the nickel compound to form nickel octanoate, which in turn is believed to be substantially reduced during the course of the reaction to elemental nickel. The mixture obtained was refluxed for 24 hours at a temperature from 155° to 175° C. and the product resulting from the reaction was analyzed. The conversion was 56.5 percent, and of that converted, 57.1 percent went to isooctylisooctenyl ether and 38.4 percent to $C_{24}$ acetals (a mixture of dioctoxyoctane isomers).

*Example II*

300 grams of isooctyl alcohol were mixed with 10 grams of Raney nickel and 5 grams of isooctanoic acid, and the mixture obtained was refluxed for 18 hours at a temperature from 155° to 175° C. 96.7 percent of the starting alcohol was converted, and of this 18.4 percent went to isooctylisooctenyl ether and 51.5 percent to the $C_{24}$ acetals of Example I. A large portion of the remaining conversion product was probably hydrocarbons formed by decarbonylation and lost during distillation.

Example III 300 grams of isooctyl alcohol were mixed with 10 grams of Raney nickel, and the mixture obtained was refluxed for 5 hours at a temperature of 155° to 175° C. The conversion was 72.8 percent with 7 percent going to the $C_{16}$ ether of Examples I and II and 74 percent to the acetals of the same examples. As in Example II a large portion of the remaining conversion product was probably hydrocarbons formed by decarbonylation and lost during distillation.

The above examples show that the most effective catalyst for obtaining acetals is Raney nickel. The use of nickel acetate tetrahydrate, together with isooctanoic acid, is very effective in obtaining high yields of ethers.

Example IV 500 grams of tridecyl alcohol are mixed with 10 grams of Raney nickel and the mixture obtained is refluxed for 5 hours at about 250° to about 265° C. A $C_{26}$ ether and a $C_{39}$ acetal are then separated from the reaction mixture by distillation.

In each of the above examples, the process was carried out at atmospheric pressure and hydrogen and water formed during the process were permitted to escape. The following example illustrates the discovery that in the present process it is absolutely necessary to remove hydrogen and water from the reaction area if the desired conversion product is to be obtained.

Example V 200 grams of isooctyl alcohol were mixed with 8 grams of Raney nickel, and the mixture was placed in a closed vessel. The mixture was heated for 6 hours at a temperature of 220° C. and hydrogen and water formed during the process were prevented from leaving the reaction area. While 16.7 percent of the alcohol was converted, the conversion was mostly to heptane and aldehyde and no appreciable amounts of acetals and ethers were detected.

Obviously, many modifications and variations of the above invention as hereinbefore set forth may be made without departing from the spirit and scope thereof, therefore only such limitations should be imposed as are indicated by the appended claims.

I claim:

1. A process for converting at least one aliphatic primary monofunctional alcohol to a product comprising 1,1-dialkoxyalkanes which comprises refluxing said alcohol at a temperature of about 120° to about 285° C. in the presence of a strong dehydrogenation catalyst for about 5 to about 12 hours while permitting hydrogen and water formed during the reaction to escape from the reaction zone.

2. A process for converting at least one aliphatic primary monofunctional alcohol to a product comprising 1,1-dialkoxyalkanes which comprises refluxing said alcohol at a temperature of about 120° to about 285° C. in the presence of about one to about 10 percent of a dehydrogenation catalyst selected from the group consisting of nickel, cobalt and iron catalysts for about 5 to about 12 hours while permitting hydrogen and water formed during the reaction to escape from the reaction zone.

3. A process for converting at least one aliphatic primary monofunctional alcohol to a product comprising 1,1-dialkoxyalkanes which comprises refluxing said alcohol at a temperature of about 120° to about 285° C. in the presence of a nickel dehydrogenation catalyst for about 5 to about 12 hours while permitting hydrogen and water formed during the reaction to escape from the reaction zone.

4. A process for converting at least one aliphatic primary monofunctional alcohol to a product comprising 1,1-dialkoxyalkanes which comprises refluxing said alcohol at a temperature of about 120° to about 285° C. in the presence of nickel acetate tetrahydrate and isooctanoic acid for about 5 to about 12 hours while permitting hydrogen and water formed during the reaction to escape from the reaction zone.

5. A process for converting at least one aliphatic primary monofunctional alcohol to a product comprising 1,1-dialkoxyalkanes which comprises refluxing said alcohol at temperature of about 120° to about 285° C. in the presence of a cobalt dehydrogenation catalyst for about 5 to about 12 hours while permitting hydrogen and water formed during the reaction to escape from the reaction zone.

6. A process for converting at least one aliphatic primary monofunctional alcohol to a product comprising 1,1-dialkoxyalkanes which comprises refluxing said alcohol at a temperature of about 120° to about 285° C. in the presence of an iron dehydrogenation catalyst for about 5 to about 12 hours while permitting hydrogen and water formed during the reaction to escape from the reaction zone.

7. A process for converting isooctyl alcohol to a product comprising an acetal and an ether which comprises refluxing said alcohol in the presence of a nickel dehydrogenation catalyst for about 5 to about 12 hours while permitting hydrogen and water formed during the reaction to escape from the reaction zone.

8. A process for converting isooctyl alcohol to a product comprising an acetal and an ether which comprises refluxing said alcohol at a temperature of about 155° to about 175° C. in the presence of Raney nickel for about 5 to about 12 hours while permitting hydrogen and water formed during the reaction to escape from the reaction zone.

9. A process for converting at least one aliphatic primary monofunctional alcohol to a product comprising 1,1-dialkoxyalkanes which comprises refluxing said alcohol at a temperature of about 120° to about 285° C. in the presence of a strong dehydrogenation catalyst for about 5 to about 12 hours while continuously removing from the reaction area hydrogen and water formed during the conversion reaction.

References Cited in the file of this patent

UNITED STATES PATENTS

| | | |
|---|---|---|
| 1,735,763 | Jaeger | Nov. 12, 1929 |
| 1,738,745 | Weith et al. | Dec. 10, 1929 |
| 1,850,836 | Guinot | Mar. 22, 1932 |
| 2,437,600 | Gresham et al. | Mar. 9, 1948 |
| 2,573,678 | Saunders | Nov. 6, 1951 |
| 2,578,724 | Mertzweiller | Dec. 18, 1951 |

OTHER REFERENCES

Reeve et al.: Jour. Amer. Chem. Soc., vol. 62 (1940), pp. 2874–2876.